(12) United States Patent
Zercher

(10) Patent No.: US 6,702,185 B1
(45) Date of Patent: *Mar. 9, 2004

(54) IDENTIFICATION DEVICE HAVING AN INTEGRATED CIRCUIT

(75) Inventor: John Michael Zercher, Columbia, PA (US)

(73) Assignee: IDenticard Systems, Incorporated, Lancaster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/293,061

(22) Filed: Nov. 13, 2002

(51) Int. Cl.$^7$ ................................................ G06K 19/02
(52) U.S. Cl. ........................................ 235/488; 235/492
(58) Field of Search ................................ 235/492, 488

(56) References Cited

U.S. PATENT DOCUMENTS

| | | | |
|---|---|---|---|
| 4,322,461 A | * 3/1982 | Raphael et al. | 428/14 |
| 4,855,583 A | 8/1989 | Fraser et al. | 235/492 |
| 4,861,644 A | 8/1989 | Young et al. | 428/195 |
| 5,074,593 A | * 12/1991 | Grosso | 283/77 |
| 5,528,222 A | 6/1996 | Moskowitz et al. | 340/572 |
| 5,785,181 A | 7/1998 | Quartararo, Jr. | 209/3.3 |
| 5,793,882 A | 8/1998 | Piatek et al. | 382/115 |
| 5,822,190 A | 10/1998 | Iwasaki | 361/737 |
| 5,879,502 A | 3/1999 | Gustafson | 156/292 |
| 5,893,960 A | 4/1999 | Holt | 156/277 |
| 5,982,284 A | 11/1999 | Baldwin et al. | 340/572.8 |
| 5,986,562 A | 11/1999 | Nikolich | 340/693.5 |
| 6,024,285 A | 2/2000 | Mish | 235/492 |
| 6,027,027 A | 2/2000 | Smithgall | 235/488 |
| 6,036,099 A | 3/2000 | Leighton | 235/488 |
| 6,086,707 A | 7/2000 | Waller | 156/277 |
| 6,107,010 A | 8/2000 | Corniglion et al. | 430/333 |
| 6,147,604 A | 11/2000 | Wiklof et al. | 340/572.1 |
| 6,206,292 B1 | 3/2001 | Robertz et al. | 235/488 |
| 6,285,342 B1 | 9/2001 | Brady et al. | 343/895 |
| 6,357,664 B1 | 3/2002 | Zercher | 235/488 |
| 6,366,260 B1 | 4/2002 | Carrender | 343/866 |
| 6,446,374 B1 * | 9/2002 | Ardiff | 40/593 |

FOREIGN PATENT DOCUMENTS

JP          61-141584       6/1986       ............ B41M/5/00

* cited by examiner

Primary Examiner—Thien M. Le
Assistant Examiner—Kimberly Nguyen
(74) Attorney, Agent, or Firm—Baker & Hostetler, LLP

(57) ABSTRACT

An identification device having an integrated circuit. The identification device has a first outer layer formed of a substrate. A second outer layer formed of a substrate having an antenna printed on an inner surface utilizing conductive ink, and an integrated circuit electrically connected to the antenna on the inner surface. A protective layer is secured to the first outer layer by a lamination process and an adhesive backing is secured to an outer surface of the second outer layer. The identification device may then be attached by the adhesive backing to a front surface of a conventional identification card to provide the conventional identification card with integrated circuit capabilities.

17 Claims, 5 Drawing Sheets

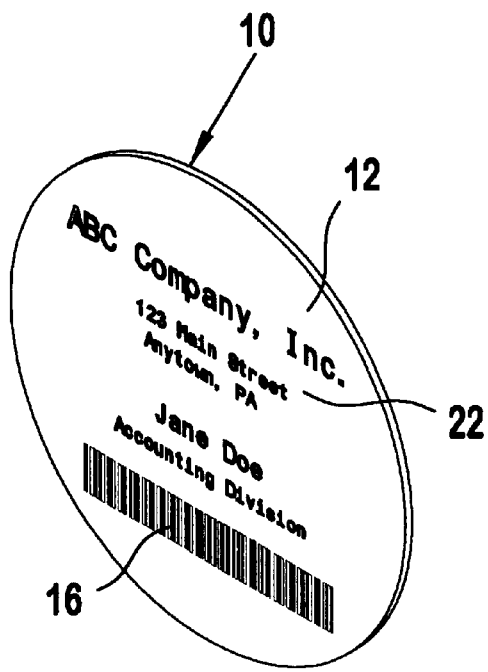
FIG. 1
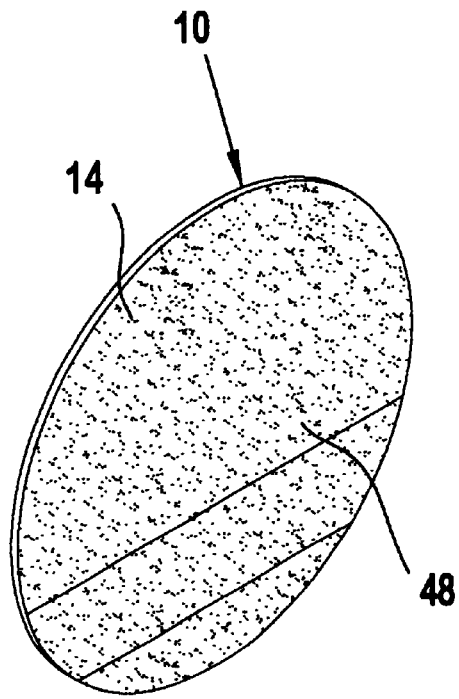
FIG. 2
FIG. 3
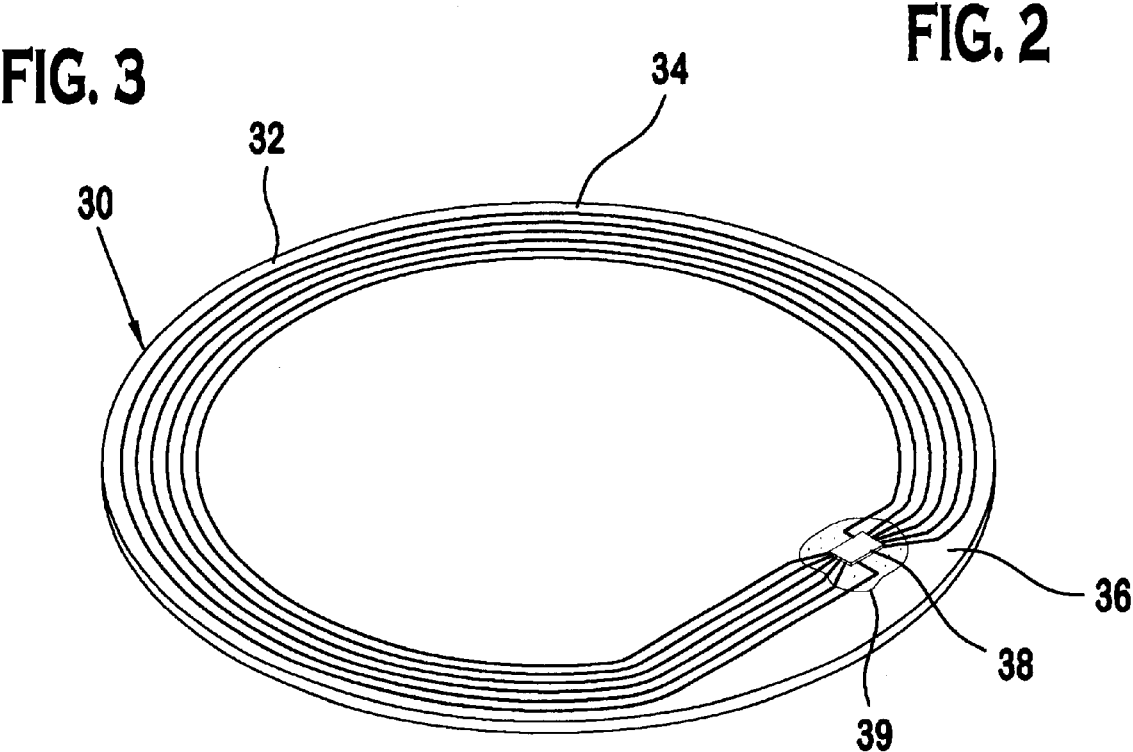

IDENTIFICATION DEVICE HAVING AN INTEGRATED CIRCUIT

FIELD OF THE INVENTION

The present invention generally relates to devices containing information about a user and, more specifically, to an identification device having an integrated circuit.

BACKGROUND OF THE INVENTION

Identification cards having integrated circuit capabilities are being utilized in greater numbers for access control systems, the tracking of personal data, points of sale, and many other applications. The identification cards having integrated circuit capabilities typically consist of a multilayer structure having one or more plastic layers surrounding integrated circuits that store data. The data is transferred to and from the identification cards either through electrical contacts or radio frequency (RF) transmission. For RF transmission, contactless versions of the identification cards include an antenna for transmitting the data to and from the integrated circuits. The identification cards having integrated circuit capabilities typically contain information about a user or an object to which they are attached. For example, in access control systems the identification card having integrated circuit capabilities may contain a user's name, employee number, and other employee specific information to allow the employee access to various locations within an employer's facilities. Within hospitals, such identification cards may contain patient specific data such as age, medical condition, allergies to medication, and other data utilized in treating and billing patients.

Several problems exist, however, in that many existing identification cards do not have integrated circuit capabilities. To supply new identification cards having integrated circuit capabilities to all users would be both costly and time consuming. Further, not all users may need identification cards with integrated circuit capabilities for long periods of time. It is therefore desirable to develop an identification device having integrated circuit capabilities that may be retrofit to an existing identification card. It is further desirable to develop a device that may be used as an ID or a tracking tag that may be retrofit to work in a wide variety of applications.

SUMMARY OF THE INVENTION

This and other objects of the invention are achieved by providing an identification device having a first outer layer formed of a substrate and a second outer layer formed of a substrate having an antenna printed on an inner surface utilizing conductive ink, and an integrated circuit electrically connected to the antenna on the inner surface. A protective layer is secured to the first outer layer by a lamination process and an adhesive backing is secured to an outer surface of the second outer layer.

BRIEF DESCRIPTION OF THE DRAWINGS

FIG. 1 is a front perspective view of the identification device according to the invention.

FIG. 2 is a rear perspective view of the identification device of FIG. 1.

FIG. 3 is a perspective view of an inner surface of a second outer layer.

DETAILED DESCRIPTION OF THE INVENTION

Figure 4:
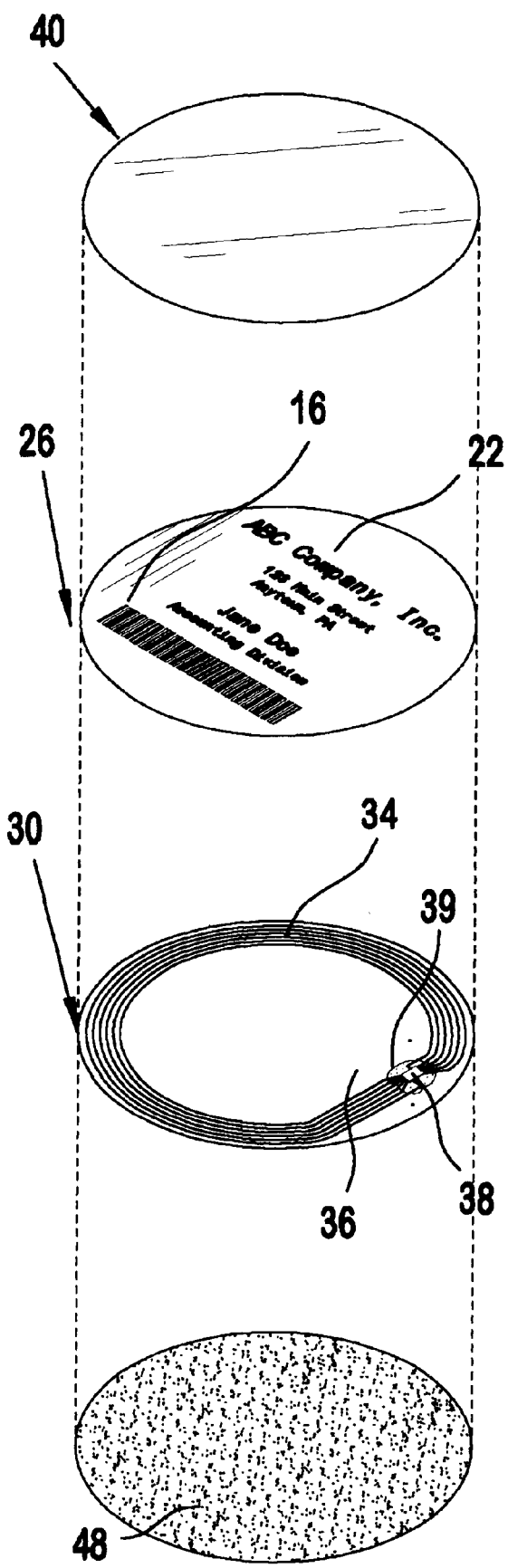
FIG. 4 is an exploded perspective view showing the layers of the identification device of FIG. 1.

As shown in FIGS. 1 and 2, the identification device 10 has a front side 12 and a back side 14. The identification device 10 is shown as being essentially circular in configuration, however, the identification device 10 may be formed in a variety of geometric configurations to achieve a substantially similar result. The front side 12 may optionally have printed information 22 along with diagrammatic or photographic information. An optional bar code 16 may also be provided on the front side 12. The back side 14 has an adhesive backing 48. As shown in FIG. 4, the identification device 10 consists of a plurality of layers which may contain an integrated circuit 38 for storing additional user specific information, an antenna 34 for transmitting data between the integrated circuit 38 and another device, or contacts for transmitting data between the identification device 10 and another device.

Each of the major components of the identification device 10 will now be described in greater detail. Referring first to FIG. 4, the identification device 10 is constructed from a plurality of layers 26, 30, 40. A first outer layer 26 is a substrate formed of a plastic material. For example, the substrate may be made of TESLIN that is manufactured by PPG Industries of Pittsburgh, Pa. It should be understood, however, that other suitable materials that are capable of receiving printed text may be utilized for the substrate. An outer surface of the first outer layer 26 optionally has the printed information 22 and/or the bar code 16. The printed information 22 and/or the bar code 16 may be applied utilizing a standard ink jet or other printer.

As shown in FIG. 4, a protective layer 40 formed of a clear laminate material is positioned adjacent to the outer surface of the first outer layer 26. The protective outer layer 40 is substantially the same size and shape as the first outer layer 26.

The second outer layer 30 is a substrate formed of a plastic material. For example, the substrate may be made of TESLIN that is manufactured by PPG Industries of Pittsburgh, Pa. It should be understood, however, that other suitable materials that are capable of receiving a printed antenna may be utilized for the substrate. As best shown in FIG. 3, printed on an inner surface of the second outer layer 30 is the antenna 34 and a plurality of positioning marks 36. The antenna 34 consists of a plurality of loops extending from an area near the positioning marks 36. The integrated circuit 38 is preferably fixed to the inner surface utilizing a curable epoxy as is well known, for example, in Flip Chip technology. The integrated circuit 38 is positioned to contact opposite ends of the antenna loops.

As shown in FIG. 4, an adhesive backing 48 is provided on the outer surface of the second outer layer 30. The adhesive backing 48 may be a pressure sensitive adhesive, such as, TRANS-KOTE manufactured by Transilwrap Company, Inc. of Franklin Park, Ill. The adhesive backing 48 is shown as covering the entire outer surface of the second outer layer 30, however, the adhesive backing may only cover a portion of the outer surface of the second outer layer to achieve a substantially similar result. It will also be appreciated and understood by those skilled in the art that although the identification device 10 is described as having an adhesive backing 48, other attachment means may be provided on the outer surface of the second outer layer.

A method of manufacturing the identification device 10 will now be described in greater detail. The method of manufacturing the first outer layer 26 will first be described in greater detail with reference to FIGS. 5 and 6. The method of manufacturing the second outer layer 30 will then be described in greater detail with reference to FIG. 6.

Figure 5:
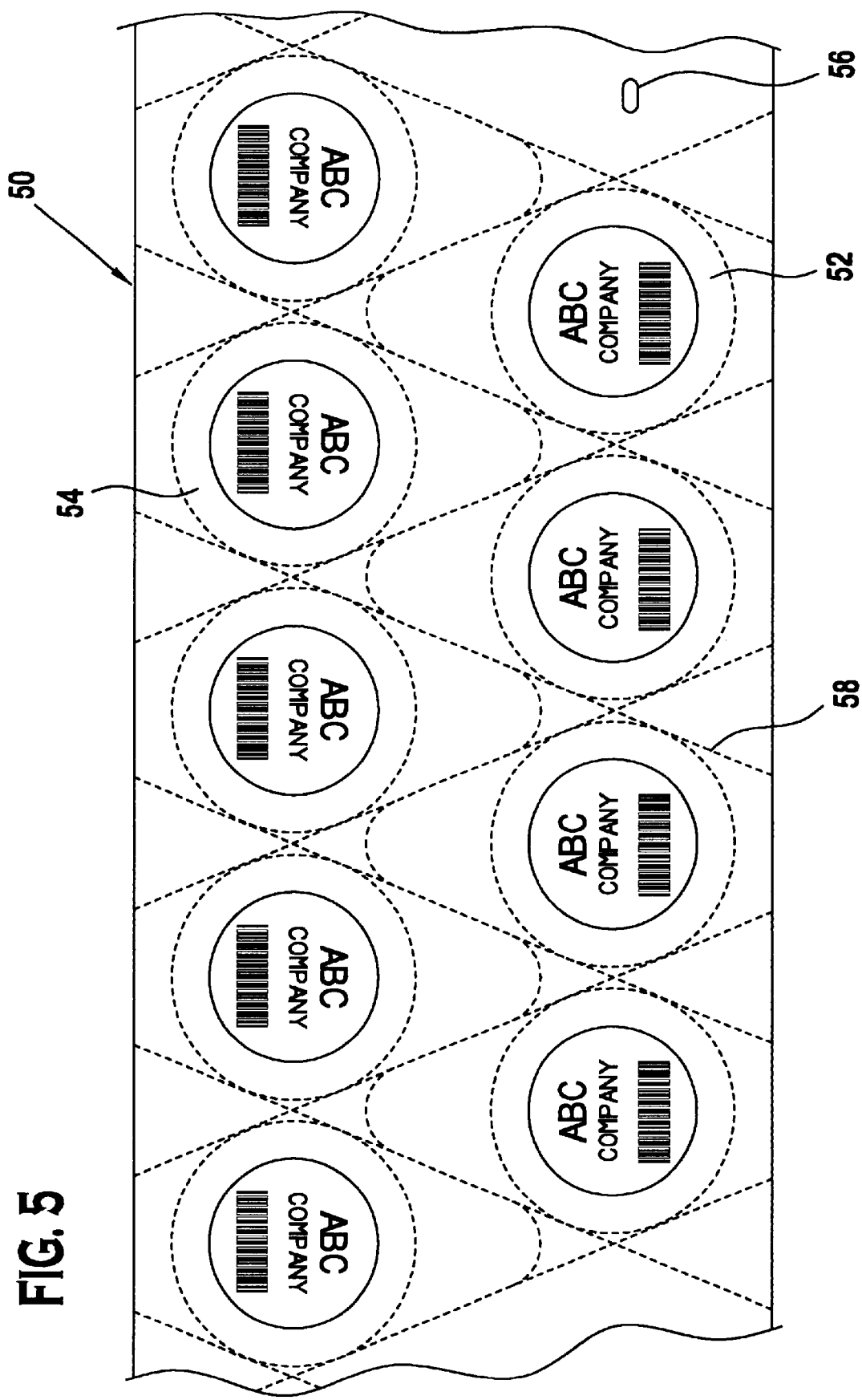
FIG. 5 is a plan view of a matrix sheet of first outer layers.
Figure 6:
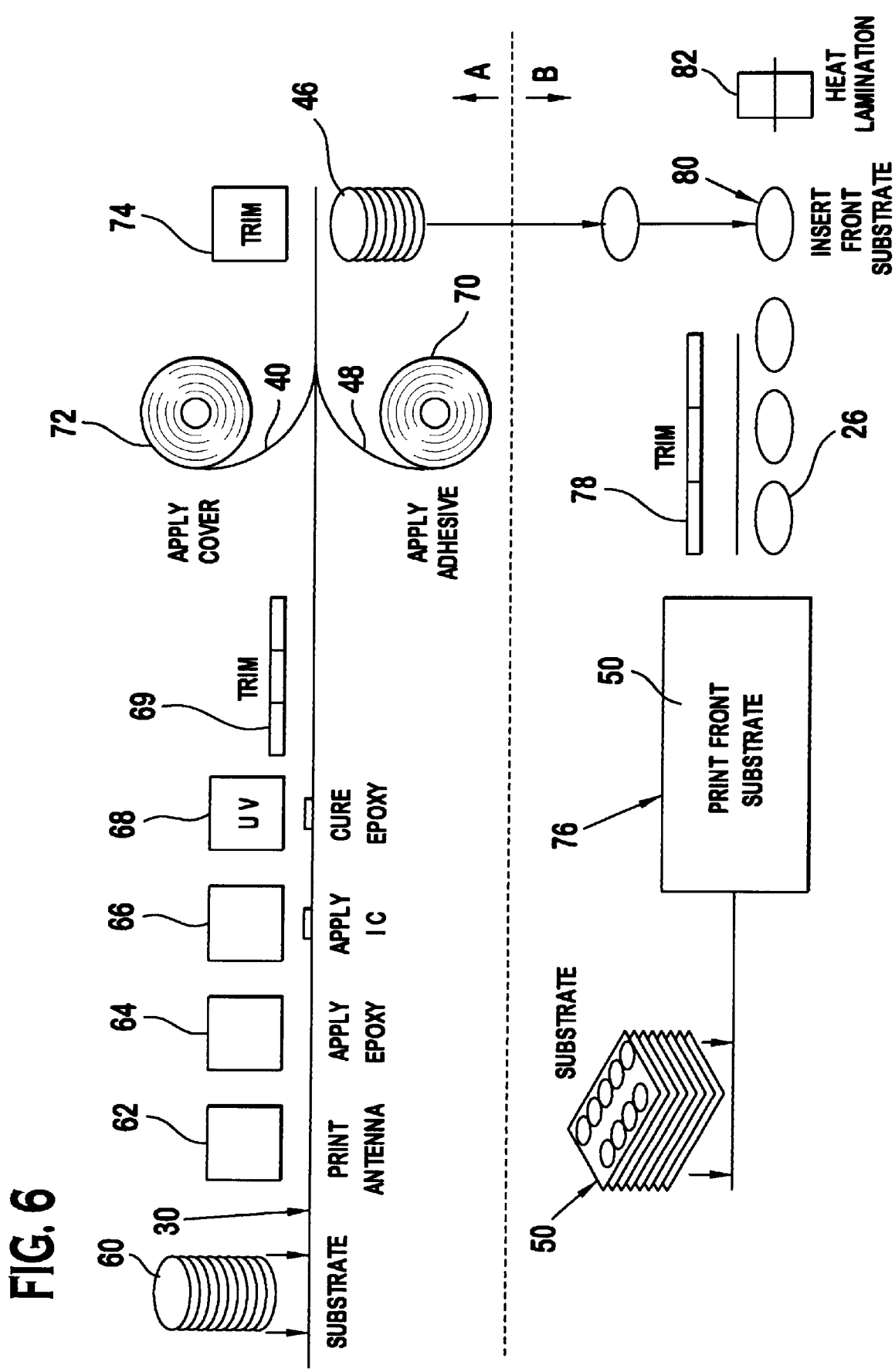
FIG. 6 is a diagrammatic view of the assembly process for the identification device.

As shown in FIG. 6 in a portion of the process labeled "B," the first outer layer 26 is manufactured by feeding the substrate through a printing station 76. At the printing station 76, the printed information 22 is printed onto the outer surface of the substrate utilizing standard printer equipment such as an ink jet or laser jet printer to form a matrix 50. It should be understood by those reasonably skilled in the art, however, that any printed information may be placed on the outer surface of the matrix 50, such as numerical codes, or magnetic printed information which is specific to a user or an object or no information at all. As shown in FIG. 5, the printed information 22 is grouped in individual device sections 52, 54. Border marks 58 are provided surrounding each individual device section 52, 54. The matrix 50 may also include positioning marks 56 that may be detected later in the process for positioning the matrix 50 within printing or cutting equipment. The matrix 50 is then cut into strips, diagonally cut, and trimmed into individual first layers 26 at a trimming station 78.

As shown in FIG. 6 in a portion of the process labeled "A," the substrate that forms the second outer layer 30 is supplied in sheets 60 that are fed through an antenna print station 62. The antenna 34 is applied utilizing standard printing equipment equipped with conductive ink. The conductive ink is then cured through a heating process. Each substrate is then fed to an epoxy application station 64 where epoxy 39 is applied in the area that will receive the integrated circuit chip 38. The substrate is then fed through an integrated circuit application station 66 where the IC chip 38 is applied over the epoxy and is positioned to be in contact with the antenna 34. The substrate continues along to an epoxy curing station 68 where the previously applied epoxy is cured to secure the IC chip 38 in place. The substrate then passes a trim station 69 wherein the substrate is cut into individual one-dimensional arrays of an essentially circular configuration. For example, a five by four line matrix having antennas 34 printed thereon may be cut into nine separate one-dimensional arrays of an essentially circular configuration.

The substrate then passes a cover application station 72 where the protective layer 40 is applied over the second outer layer 30. Once the protective layer 40 is applied over the second outer layer 30, the second outer layer 30 passes through a second trim station 74 where the second outer layer 30 is cut into individual subassemblies 46. The subassemblies 46 then pass an adhesive station 70 where adhesive backing 48 is applied to the outer surface of the second outer layer 30. Each individual subassembly 46 at this stage contains a protective layer 40 positioned adjacent to the inner surface of the second outer layer 30 that has an adhesive backing 48 on the outer surface.

To complete the assembly, the trimmed first layers 26 from the portion of the process labeled "B" are individually inserted into the subassemblies 46 at insertion step 80. The subassemblies 46 having the first layer 26 inserted are then laminated at the lamination step 82 utilizing standard lamination equipment that seals the outside edge of the protective layer 40 about the outside edge of the first and second layers 26, 30.

Figure 8:
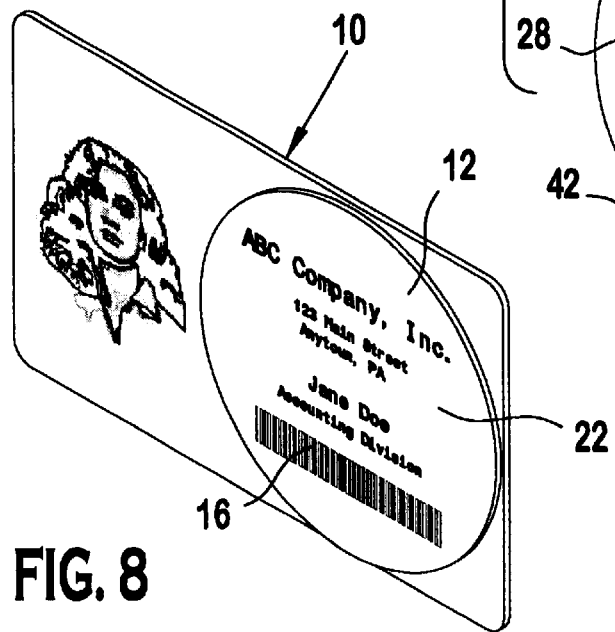
FIG. 8 is a front perspective view of a conventional identification card having the identification device attached thereto.

The completed identification device 10 may then be attached by the adhesive backing 48 to a front surface of a conventional identification card 20, as shown in FIG. 8. Because the identification device 10 is retrofit to the existing identification card 20, the identification card 20 is capable of having integrated circuit capabilities and as such may be used in a wide variety of applications, such as an ID or tracking tag.

Figure 7:
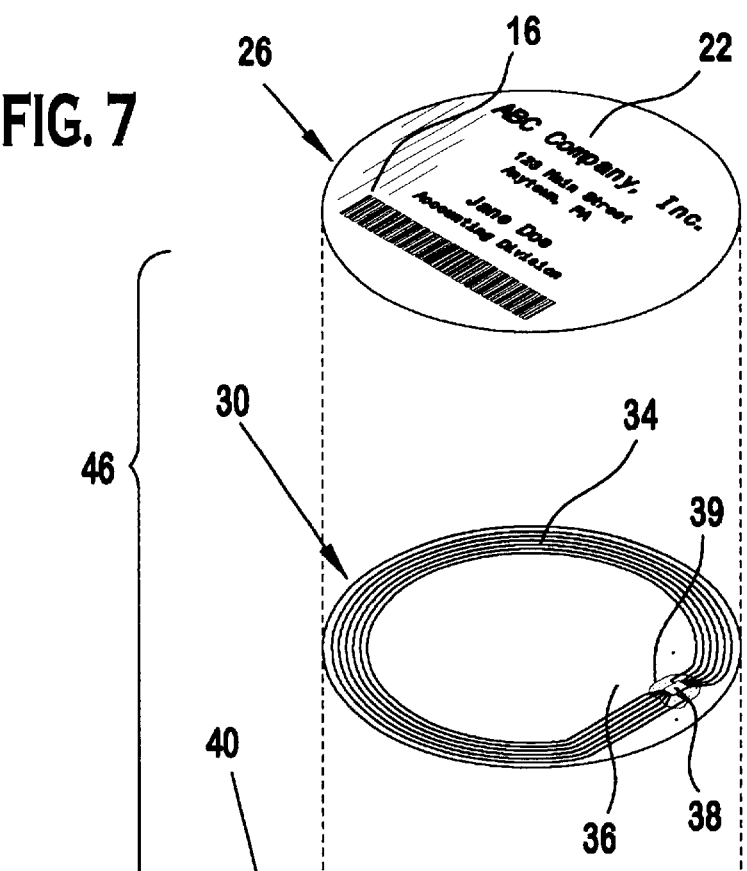
FIG. 7 is an exploded perspective view showing the layers of an alternate embodiment of the identification device.

In an alternate embodiment, shown in FIG. 7, the identification device 10 may be formed with a protective layer 40 positioned adjacent to the outer surface of the first outer layer 26 and a second protective layer 44 positioned adjacent to the outer surface of the second outer layer 30. The adhesive backing 48 would then be provided on the outer surface of the second protective layer 44. The protective layer 40 and second protective layer 44 may be separate elements or may be formed as a protective sleeve having a hinged end 42. In the alternate embodiment the second outer layer 30 would be placed between the protective outer layer 40 and the second protective layer 44 at the cover application station 72 to subsequently form a subassembly 46. The subassemblies 46 would then pass the adhesive station 70 where adhesive backing 48 would be applied to the outer surface of the second protective layer 44 after the lamination step 82. The completed identification device 10 may then be attached by the adhesive backing 48 to a front surface of a conventional identification card 20, as shown in FIG. 8.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. An identification device comprising:
    a first outer layer formed of a substrate;
    a protective layer secured to the first outer layer by a lamination process;
    a second outer layer formed of a substrate having an antenna printed on an inner surface utilizing conductive ink, and an integrated circuit electrically connected to the antenna on the inner surface; and
    an attachment layer secured to an outer surface of the second layer.

2. The identification device of claim 1, wherein the first outer layer has printed text.

3. The identification device of claim 1, wherein the first outer layer substrate is formed from a plastic material for receiving printed text.

4. The identification device of claim 1, wherein the second outer layer substrate is formed from a plastic material for receiving printed text.

5. The identification device of claim 1, wherein the attachment layer is an adhesive backing.

6. The identification device of claim 5, wherein the adhesive backing is a pressure sensitive adhesive.

7. An identification device comprising:
    a first outer layer formed of a substrate;
    a second outer layer formed of a substrate having an antenna printed on an inner surface utilizing conductive ink, and an integrated circuit electrically connected to the antenna on the inner surface;

a first protective layer secured to the first outer layer by a lamination process;

a second protective layer secured to the second outer layer by a lamination process; and an attachment layer secured to an outer surface of the second protective layer.

8. The identification device of claim 7, wherein the first outer layer has printed text.

9. The identification device of claim 7, wherein the first outer layer substrate is formed from a plastic material for receiving printed text.

10. The identification device of claim 7, wherein the second outer layer substrate is formed from a plastic material for receiving printed text.

11. The identification device of claim 7, wherein the attachment layer is an adhesive backing.

12. The identification device of claim 11, wherein the adhesive backing is a pressure sensitive adhesive.

13. The identification device of claim 7, wherein the first and second protective layer are joined by a hinged end.

14. A method of making an identification device comprising:

supplying a substrate to an antenna print station;

printing an antenna on an inner surface of the substrate;

applying an integrated circuit chip to the inner surface, the integrated circuit chip being in electrical contact with the antenna;

applying a protective layer to the substrate; and applying an attachment layer to an outer surface of the substrate.

15. The method of claim 14, wherein the substrate is supplied to the antenna print station in a sheet.

16. The method of claim 14, further comprising trimming the substrate sheets after applying the integrated circuit chip to the antennas.

17. The method of claim 14, wherein the attachment layer is an adhesive backing.

\* \* \* \* \*